June 17, 1969     C. R. TESSMAN     3,450,286
CHAFF AND STRAW HANDLING ATTACHMENT
Filed Jan. 2, 1968

INVENTOR
Charles R. Tessman

BY Robert E. Klene
ATTORNEY 3,450,286
CHAFF AND STRAW HANDLING ATTACHMENT
Clarence R. Tessman, Goodrich, N. Dak. 58444
Filed Jan. 2, 1968, Ser. No. 694,994
Int. Cl. A01f 12/46, 12/40
U.S. Cl. 214—522     1 Claim

ABSTRACT OF THE DISCLOSURE

The invention comprises a chaff and straw handling attachment for a combine wherein said combine has an inclined straw conveyor adjacent its rearward end with a straw chopper rearward of said straw conveyor, a chaff conveyor pivotally mounted at its upper end of said combine between said chopper and straw conveyor, means for powering said chaff conveyor, and means to secure said chaff conveyor in an inclined position to receive the chaff at the chaff outlet of the combine and convey it into the straw chopper where the chaff may be thrown out of the combine by the straw chopper along with the straw, and means for releasing said chaff conveyor whereby said chaff conveyor may pivot away from said chaff outlet and said chaff may travel out of said combine separate from said straw, and an inclined chute attachment mounted to the combine adjacent the rearward end of the straw chopper, said chute attachment being inclined rearwardly and upwardly so that the straw and chaff being thrown out of the chopper may arc along an upward path for easier reception of the straw and chaff by a vehicle towed behind the combine.

---

This invention relates to harvesting equipment, more particularly it relates to combines for selective handling of straw and chaff.

It is an object of the invention to provide a novel attachment to combines for selectively allowing the chaff to fall to the ground or to be transferred into the chopper of the combine and be thrown out of the combine by the chopper along with the straw.

It is a further object of this invention to provide a novel attachment for a combine which enables the combine to throw the chaff and straw out of the last stage of the combine operation so that it may be received in a receptacle towed behind the combine.

It is another object of the invention to provide a novel attachment for harvesting equipment so that the combine may be employed to discharge the chaff and straw into a receptacle so that both the chaff and straw may be saved for feed for farm animals.

Further objects and advantages will be apparent as the description proceeds and when taken in conjunction with the accompanying drawing wherein.

Briefly stated the invention comprises an attachment to the rear of a combine which has a pivotally-mounted conveyor which is pivotally mounted at its upper end to the combine immediately in front of and above the chopper of the combine with the lower end of the conveyor being adapted to swing forward to the chaff outlet of the combine to receive the chaff and convey it into the chopper where the chaff may be thrown out by the straw chopper along with the straw. The invention further includes a chute attachment to the outer end of the straw chopper which is inclined upwardly so that the straw and chaff may be deflected upwardly and projected into a loading wagon.

Figure 1:
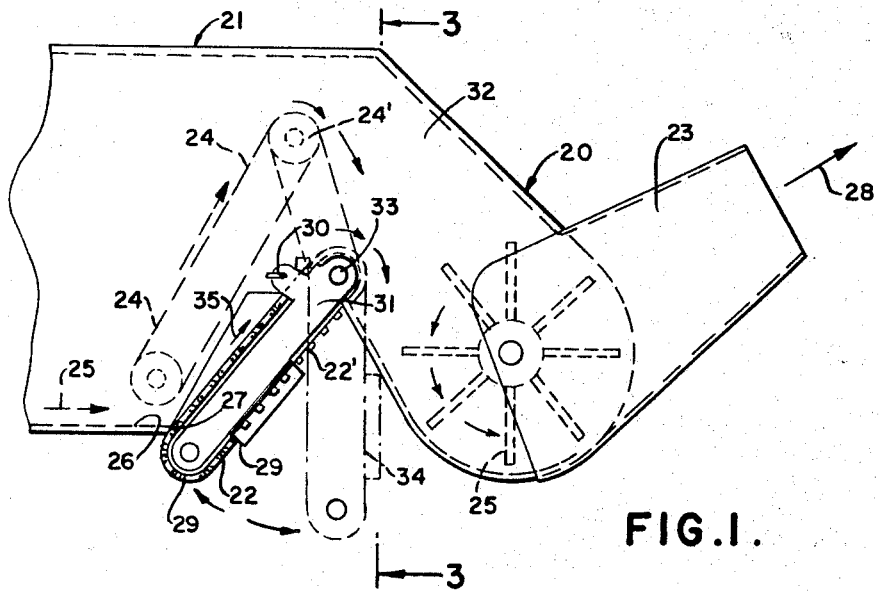
FIGURE 1 is a side-elevational view of the chaff and straw handling attachment.
Figure 2:
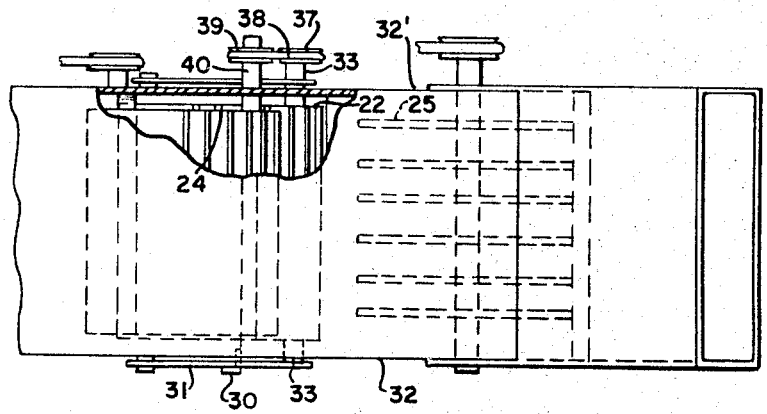
FIGURE 2 is an enlarged side-elevational view of the chaff and straw handling attachment.
Figure 3:
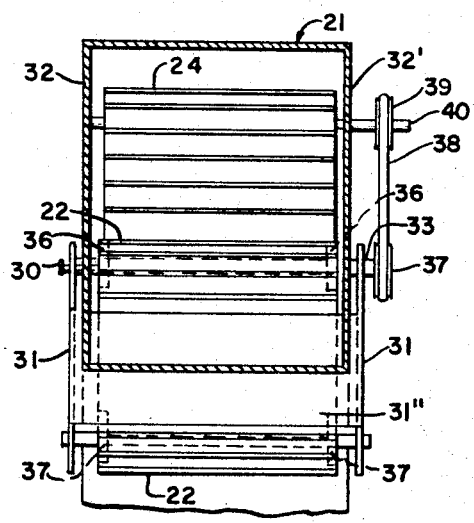
FIGURE 3 is a cross-sectional view of the chaff and straw handling attachment taken along line 3—3 of FIGURE 1.

Referring more particularly to the drawing, in FIGURE 1 the chaff and straw handling attachment invention 20 is illustrated being attached to the rearward end of a combine 21 and the attachment invention 20 has a pivotally mounted conveyor 22 and an inclined chute 23. The straw and chaff travel rearwardly along the combine in a conventional manner until they approach the conventional combine conveyor 24. Arrow 25 illustrates the movement of the straw and chaff as they approach the conveyor 24. At this point the straw will be carried upward by the conveyor 24 in a conventional manner while the chaff continues to travel along the bottom 26 of the combine and out the rearward end 27 of the combine. The straw, being carried up the conveyor 24, when it reaches the top 24' of the conveyor then will gravitate downward from the upper end 24' of the conveyor into a conventional straw chopper 25 which chops the straw into smaller segments. The chopper 25 then throws the straw upward and rearward out the chute 23 in the direction indicated by the arrow 28, where it may be caught in a wagon towed behind the combine 21.

The conveyor 22 has a sheet metal frame 37 with a back flange portion 38 and a pair of side flanges 31 and 31' formed integrally with the back flange portion 38. The conveyor 22 has an endless belt 22' with lifting lugs 29 and rotates in a clockwise direction about rollers 36 and 37 when viewed from FIGURE 1. The upper roller 36 is fixed to shaft 33 and shaft 33 is rotatively mounted to the side walls 32 and 32' of the combine. The roller 36 is fixed to a shaft 36' and the shaft 36' is rotatably mounted in the side flanges 31 and 31'. The shaft 33 is also rotatably mounted in the side flange 31 and 31'. A pulley 37 is fixed to the outer end of shaft 33 and the pulley 37 is driven by a belt 38, which belt in turn is driven by pulley 39. Pulley 39 receives its drive from the rotation of the shaft 40 of the straw conveyor.

When it is desired to allow the chaff to drop to the ground the pin 30 will be pulled out of the side flange 31 of the conveyor 22 and sidewall 32 of the combine 21 allowing the conveyor 22 to pivot counterclockwise downwardly about the shaft 33. Pulling of the pin 30 allows the conveyor 22 to pivot downwardly to a vertical position as illustrated by phantom lines 34, thereby allowing the chaff traveling rearwardly along the bottom wall 26 to drop from the rearward edge 27 of the wall onto the ground.

When it is desired to mix the chaff with the straw, the conveyor 22 will be pivoted about shaft 33, returning the conveyor 22 to its position illustrated in the sold lines and the pin 30 will be replaced to lock the conveyor 22 in this position, whereupon the chaff will now travel rearwardly along the bottom wall 26 and upwardly and rearwardly on conveyor 22, as illustrated by the arrow 35, where it will travel downwardly along the inclined wall 40 and be fed into the chopper 25, along with the straw being fed into the chopper from the conveyor 24. The straw chopper 25 rotates with sufficient rotational speed to throw the straw and chaff upwardly and rearwardly along the inclined chute 23 thereby throwing both the chaff and straw into a wagon which may be towed behind the combine so that both the straw and chaff may be saved for cattle food or forage.

This it will be seen that a novel straw and chaff handling invention has been provided whereby if the operator desires only the straw to be saved for use for cattle feed and the like, he will drop conveyor 22 to its verticle position illustrated in dashed lines in FIGURE 1, or if the operator desires to have both the straw and chaff saved he will pivot the conveyor 22 in its alternate position illustrated in solid lines in FIGURE 1 so as to feed the chaff, along with the straw, into the straw chopper where it can be thrown rearwardly into a wagon for saving both the straw and chaff for subsequent use.

It will further be seen that by providing the inclined chute for the straw chopper, the straw chopper may be used for the same purpose as a blower by throwing the chaff as well as the straw rearwardly and upwardly into a wagon being towed behind the combine.

It will be obvious that various changes and departures may be made to the invention without departing from the spirit and scope thereof and accordingly it is not intended that the invention be limited to that specifically described in the specification or as illustrated in the drawing but only as set forth in the appended claims, wherein, what is claimed is:

1. A chaff and straw handling attachment for a combine wherein said combine has an inclined straw conveyor adjacent its rearward end with a straw chopper rearward of said straw conveyor comprising a chaff conveyor pivotally mounted at its upper end of said combine between said chopper and straw conveyor, means for powering said chaff conveyor, and means to secure said chaff conveyor in an inclined position to receive the chaff at the chaff outlet of the combine and convey it into the straw chopper where the chaff may be thrown out of the combine by the straw chopper along with the straw, and means for releasing said chaff conveyor whereby said chaff conveyor may pivot away from said chaff outlet and said chaff may travel out of said combine separate from said straw, and an inclined chute attachment mounted to the combine adjacent the rearward end of the straw chopper, said chute attachment being inclined rearwardly and upwardly so that the straw and chaff being thrown out of the chopper may arc along an upward path for easier reception of the straw and chaff by a vehicle towed behind the combine.

References Cited

UNITED STATES PATENTS 3,317,064  5/1967  Fingerut _____ 302—6

FOREIGN PATENTS 244  11/1926  Australia.

ALBERT J. MAKAY, *Primary Examiner.*

U.S. Cl. X.R.

214—83.26; 130—27